Dec. 22, 1970        L. RABINOWITZ        3,549,247
SPECTACLE TEMPLE TENSIONER
Original Filed March 15, 1968
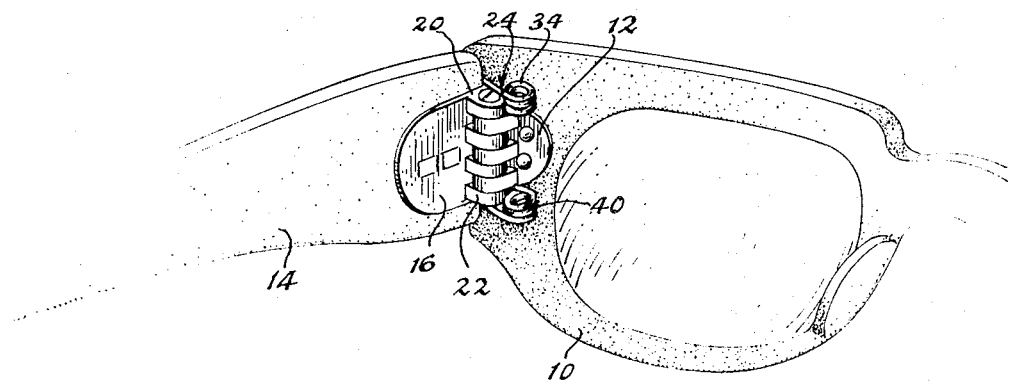
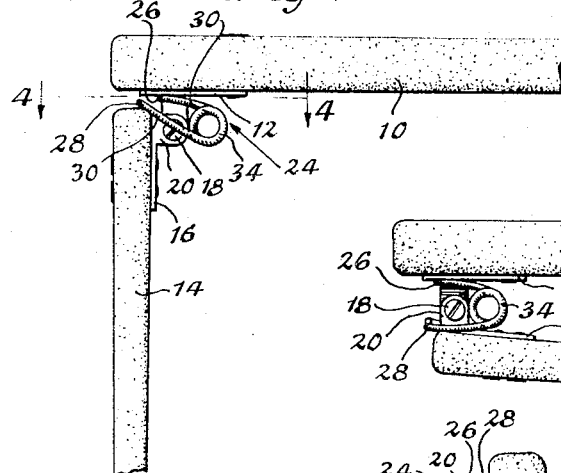
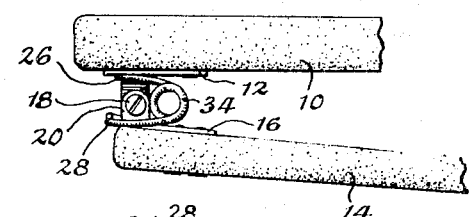
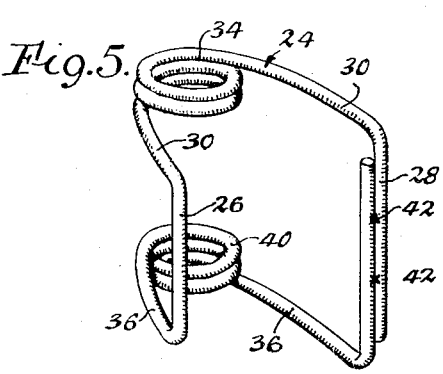
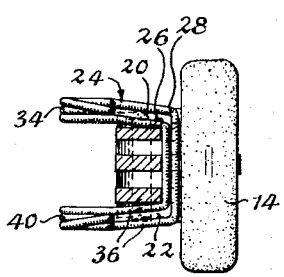
INVENTOR.
LEWIS RABINOWITZ
BY
*Bean & Bean*
ATTORNEYS

United States Patent Office 3,549,247
Patented Dec. 22, 1970

3,549,247
SPECTACLE TEMPLE TENSIONER
Lewis Rabinowitz, Tonawanda, N.Y., assignor to Ellar Products, Inc., Silver Creek, N.Y.
Continuation of application Ser. No. 713,431, Mar. 15, 1968. This application Oct. 28, 1969, Ser. No. 871,984
Int. Cl. G02c 5/16; E05f 1/12
U.S. Cl. 351—113                          5 Claims

ABSTRACT OF THE DISCLOSURE

A spectacle temple tensioner adapted to be applied between a temple and front frame; said device comprising spaced bar portions bearing on the front end of the temple and the back of the front frame adjacent to, but outside of, the hinge connection between said temple and frame, and coil spring portions between each side of said bar portions positioned to the inside of the hinge connection and serving to releasably hold the tensioner in place and supply desired tension to the bar portions.

---

This is a continuation of Ser. No. 713,431, filed Mar. 15, 1968, now abandoned.

BACKGROUND OF THE INVENTION

The invention is adapted for use with existing eyeglass frames having conventional hinges between the front frame and the temples, to provide a reasonable amount of pressure between each end of the front frame and the front end of each adjacent temple to insure that the temples will remain in snug contact with the sides of the head of the wearer.

A variety of devices have been previously suggested for the above purpose but each are defective for one reason or another. Where rubber grommet types have been used, the rubber tends to deteriorate due to a number of causes and eventually the desired resiliency is lost or the grommet breaks. Where metallic types of tensioners have been suggested, they have required either initial special construction on the part of the frame manufacturer, or disassembly of the frame and mutilation of frame or hinge parts by the optician in order to emplace the tensioner.

An object of the present invention is to overcome the defects of prior practices by using a unitary metallic or plastic spring type construction which will not be subject to the deterioration propensities of rubber.

A further object is to provide a unitary tensioner which will not require any change in the manufacture of conventional frames.

A further object is to provide a device which will not require any mutilating of the spectacle parts by an optician.

Other objects and advantages of the invention will be apparent from the following specification and the accompanying drawing wherein:

FIG. 1 is a fragmentary perspective view of a spectacle with a conventional hinge connection showing the coil spring portions of the tensioner;

FIG. 2 is a top plan view showing the invention in operative position;

FIG. 3 is a top plan view of the tensioner operating to urge the front frame and a temple together;

FIG. 4 is a view taken on line 4—4 in FIG. 2 looking in the direction of the arrows; and FIG. 5 is an enlarged perspective of the unitary tensioner per se.

All of the views are slightly enlarged for purposes of clarity, but the tensioner can be used with a variety of styles, sizes and shapes of spectacles.

By way of example, the invention is illustrated as being applied to a seven barrel hinge but obviously could be used with other size hinges; and only one temple is illustrated and approximately one-half of the front frame whereas a duplicate tensioner would normally be applied over each of the customary two hinges.

A front frame 10 having the usual hinge plate 12 attached thereto by bolts, rivets or screws is connected to a temple piece 14 through the hinge plate 16 and hinge pivot pin 18.

As illustrated, hinge plate 16 carries four hinge barrels or leaves including outer leaves 20 and 22, whereas hinge plate 12 carries three intermeshing hinge barrels or leaves; the construction providing an open space between the edge of leaves 20 and 22 and the adjacent back of the front plate.

The tensioner 24 is clearly illustrated in FIG. 5, and may be made of one continuous length of spring wire having a first front bar portion 26, and a second wider front bar portion 28. Leg 30 joining corresponding ends of the bar portion is formed with a helical coil spring portion 34, and leg 36 joining the other ends of the bar portions is formed with a helical coil spring portion 40. Each leg is of a general V-shape helical coil portion forming the apex of the V. The two ends of wire which form the bar 28 may be welded together if desired as illustrated at 42. It would also be possible to make the tensioner out of substantially rigid wire material as long as the coil portions have spring characteristics.

In another form that the device might take, the coil portions 34 and 40 would be eliminated, and the legs alone would provide the desired spring tension when the device is put into use, with the legs in frictional contact with opposite sides of the interfitting hinge parts.

In FIG. 5 the invention is shown in untensioned condition, and the method of inserting the tensioner in the frame will now be described. With the temple folded against the front frame, the coils 34 and 40 may be manually forced further apart and forced past the hinge leaves and then released whereby coil 34 will be positioned on the inner side of the hinge connection behind leaf 20, and coil 40 on the inner side of the hinge connection behind leaf 22, with the narrower first bar 26 bearing on the front of hinge plate 12 or on the adjacent part of the front frame, and with the wider second bar 28 bearing on the front end of the temple. Both bars being on the outside of the hinge connection. In forcing the tensioner into place the front bars are forced somewhat toward each other thereby creating a tensioned condition. It will be readily seen that with the construction described, the tensioner will be held in its proper place, will not become accidentally dislodged, and will serve to apply closing pressure or tension tending to keep the temple against the side of a wearer's head. In the event a heavy wire is used so that it is not possible to spread the coils apart, an optician can remove hinge pin 18, and with the hinge parts separated, put the tensioner in place as hereinbefore described, between the front frame and temple; refit the hinge parts and replace the hinge pin and the unit will be operative.

While steel wire has been shown and described as being the material used in the tensioner, it is possible that plastic wire material may be used.

What is claimed is:

1. In combination with a spectacle frame including a front frame and a temple member, a first hinge including a plate fixed to the rear face of said front frame, a second hinge including a plate fixed to the inner side of said temple member adjacent one end thereof, said hinge plates having interleaved barrels projecting therefrom, and a hinge pin projecting through said barrels in rearwardly offset relation to said rear face of said front frame and in laterally offset relation to said inner side of said temple member, the height of the barrels of one hinge being greater than the height of the barrels of the other hinge, the improvement comprising:

a tensioner for said temple member, said tensioner including first and second pairs of spaced legs, one of said pairs of legs being spaced apart a distance corresponding to the height of the barrels of one hinge and being in frictional contact therewith and the other pair of said legs being spaced apart a distance corresponding to the height of the barrels of the other hinge and being in frictional contact therewith, a bar portion at one end of each pair of legs, one bar portion being in engagement with the plate of said first hinge and the other bar portion being engaged with said one end of said temple member and at least one of said bar portions joining its associated legs, both bar portions lying on one side of said hinge plates, and spring means lying on the opposite side of and behind said hinge plates and joining the opposite ends of corresponding legs of the two pairs normally to maintain such corresponding legs in V-shape disposition.

2. In the assembly as defined in claim 1 wherein spring means comprises a pair of spring coils, each spring coil joining said corresponding legs and being of a height accommodating the disparity in spacing between said two pairs of legs.

3. In the assembly as defined in claim 2 wherein said legs are of such lengths as to position said spring coils immediately adjacent said barrels.

4. In the assembly as defined in claim 3, wherein said bar portions are of different lengths, and one pair of said legs being longer than the other.

5. In the assembly as defined in claim 1 wherein said bar portions are of different lengths, and one pair of said legs being longer than the other.

References Cited

UNITED STATES PATENTS 2,527,604   10/1950   Walk _____ 267—155X

OTHER REFERENCES

Journal of the American Optometric Assoc., vol. 34, No. 14 pp. 1175–1176 (9/1963).

DAVID SCHONBERG, Primary Examiner

R. L. SHERMAN, Assistant Examiner

U.S. Cl. X.R.

16—180